Oct. 19, 1965  H. A. RAAB  3,212,434

BALE TENSIONING STRUCTURE

Original Filed Aug. 7, 1962  2 Sheets-Sheet 1

INVENTOR.
HILARY A. RAAB
BY
Charles S. Penfold
ATTORNEY

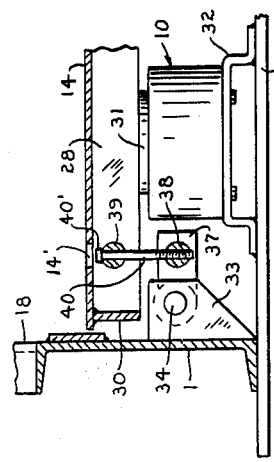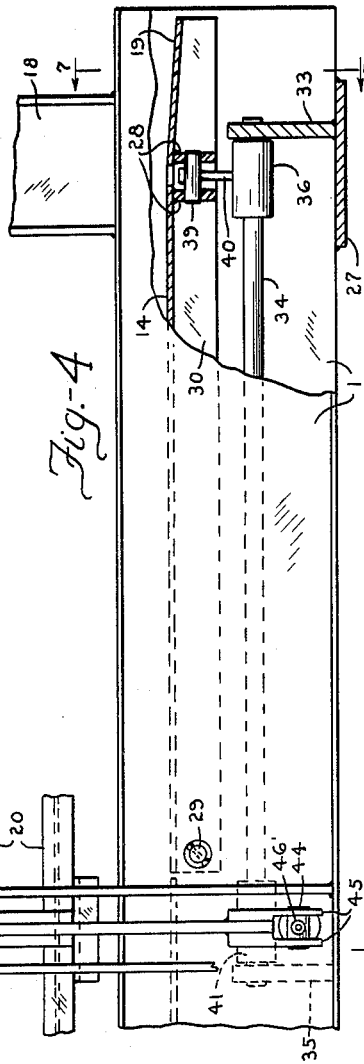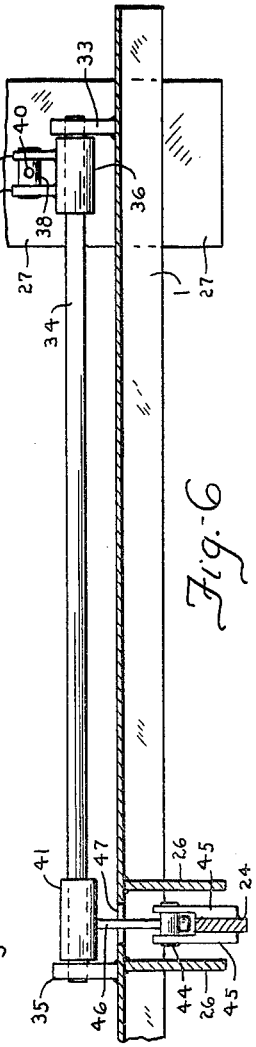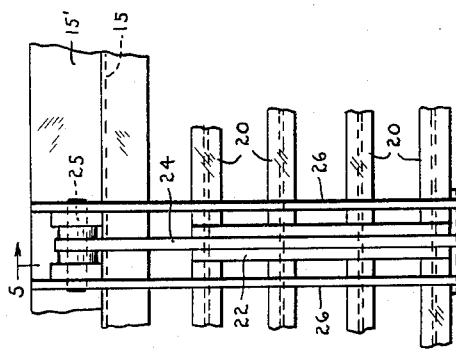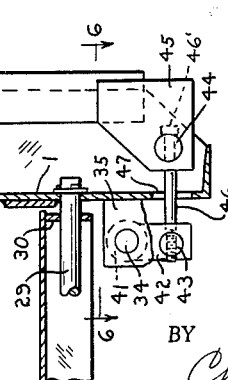
INVENTOR.
HILARY A. RAAB
BY Charles S. Penfold
ATTORNEY United States Patent Office 3,212,434
Patented Oct. 19, 1965

3,212,434
BALE TENSIONING STRUCTURE
Hilary A. Raab, Hammond, Ind., assignor to East Chicago Machine Tool Corporation, East Chicago, Ind., a corporation of Indiana
Continuation of application Ser. No. 215,391, Aug. 7, 1962. This application June 15, 1964, Ser. No. 376,610
14 Claims. (Cl. 100—192)

The subject application is a continuation of my application Serial No. 215,391, filed August 7, 1962, now abandoned.

The subject invention relates generally to baling equipment and more particularly is directed to an apparatus or system comprising a plurality of assemblies or units which are operatively associated in a unique manner whereby to automatically form bales of uniform size and maximum density.

The equipment is preferably employed to bale material such as scrap paper, including, for example, box and corrugated board, newspapers, magazines, books, and the like, but may be utilized to bale any other suitable material or product.

An object of the invention is to provide a baler embodying improved principles of design and construction. More specifically in this respect, an object is to provide a baler comprising, among other things, movable walls forming a chamber and means including torsion rods or bars operatively connecting the walls, as distinguished from the sprocket and chain mechanism disclosed in my copending application, Serial No. 339,068, filed January 13, 1964. The broader aspects of the operative relationship between the relatively movable walls of the baler apparatus are disclosed in the aforesaid copending application.

A significant object of the invention is to provide a baler with an elongate chamber for receiving the material to be compressed to form a mass or bale, including means preferably in the form of one or more relatively movable walls or members which are operatively connected by torsion rods in a unique manner for applying radial pressure to the mass in order to retard the normal forward travel of the mass while it is in the process of being formed. The arrangement is such that pressure is also applied to a mass or bale which has previously been formed so that the latter affords a resilient movable abutment for the mass or bale being formed. In other words, the resistance offered by the formed bale is sufficient for a ram to properly and efficiently form a new bale of substantially uniform compactness.

Another object of the invention is to provide a unique setup whereby the torsion rods in combination with the movable walls and the density control mechanism serve to automatically relieve, compensate or adjust the pressure applied to the mass being baled and forced through the baler.

A particular object of the invention is to provide a baler in which the elongate chamber includes a pair of side walls and a bottom wall or platform, with means including rods for imparting relative movement to the side walls to apply pressure to the mass during its formation and movement to the bottom wall to augment the pressure exerted by the side walls.

A significant object of the invention is to provide a baler comprising a frame, an elongate chamber provided with an opening adjacent one end thereof for receiving material to be compressed, means for forcibly moving the material longitudinally in the chamber to compress it as it is introduced thereto through the opening, novel means including torsion rods for applying a radial pressure to the material while it is being formed into a bale and offering resistance to its movement, and means operatively connecting said moving means and said pressure applying means in a manner whereby the latter controls the force exerted by the former.

A particularly important object of the invention is to provide a baler of the character above described in which the torsion rods or members serve to operatively connect the movable bottom wall of the elongate chamber with the movable side wall structures whereby to produce advantages and promote efficiency over the disclosure in my copending application.

Other objects reside in providing a machine or apparatus which offers advantages with respect to manufacture and assembly, adjustability, installation, durability, safety and low cost of maintenance.

Many other objects and advantages of the invention will become apparent after the description hereinafter set forth is considered in conjunction with the drawings annexed hereto.

In the drawings:

FIGURE 4 is a partial side elevation of the baler, with portions in section illustrating details of the mechanism operatively connecting movable walls of a baling chamber;

FIGURE 5 is a partial vertical section taken substantially on line 5—5 of FIGURE 4;

FIGURE 6 is a partial horizontal section taken substantially on line 6—6 of FIGURE 5; and FIGURE 7 is a partial vertical section taken substantially on line 7—7 of FIGURE 4.

Figure 1:
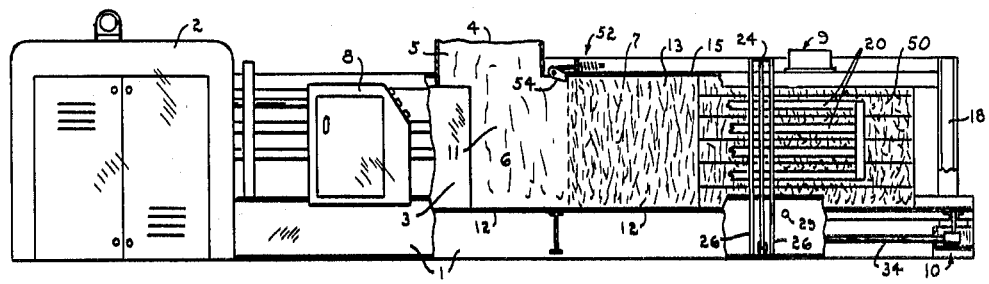
FIGURE 1 is an elevational view of the baler structure with portions in section, including a tied bale and one in the process of being formed.

The baler may be designed and constructed in various ways but as exemplified in the drawings, it is made elongate and constructed from relatively strong and heavy material to provide, among other things, a base having side walls 1 and suitable framework for supporting the operating components of the baler.

One extremity of the baler is preferably constructed to provide a housing 2 for means employed to operate or move a head 3 of a ram in one end of an elongate chamber to compact the material as it is introduced to the chamber from a chute 4 through an entrance opening 5. The chamber may be referred to as including a first or baling chamber 6 in which the ram head reciprocates to pack the received material and an elongate second or bale forming chamber 7 in which the mass of material is primarily formed or shaped into a bale. The machine is provided with suitable controls located in the housing 2 for controlling the operating means for the ram means, a cabinet 8 for additional controls, a device generally designated 9 assisting to measure the length of a bale being formed, and an actuating or hydraulic unit designated 10, all of which will be described subsequently.

The first baling chamber 6 is directly below the chute and is defined by a pair of opposed stationary walls 11, a bottom wall 12, the ram head and the inner end of a mass of material 13 being compressed. The forming or second chamber constitutes a continuation of the chamber 6 so that this material is compacted and moved longitudinally through the chambers.

The forming or baling chamber is elongate and preferably includes a stationary bottom wall constituting a continuation of the bottom wall 12 of the chamber 6, a wall or tiltable platform 14 pivotally mounted at its inner end to the frame, a stationary top wall 15, and a pair of corresponding relatively movable side wall structures or units generally designated 16. The top wall 15 extends between the side wall structures 16 and is supported on a pair of inner pillars 17 and on a pair of outer pillars 18. The pillars are carried by the side walls 1 of the base. It will be noted that the free end of the tiltable platform 14 is downturned at 19, as depicted in FIGURE 4. The free end of the top wall is provided with an upturned portion (not shown) which enables the upper portion of the bale to freely leave the top wall without tearing such portion and the downturned portion 19 is so disposed in relation to the upturned portion that the lower portion of the bale leaves the platform in advance of the upper portion to release the pressure at the upper portion and thereby provide a well shaped bale of uniform cross-section.

Each of the side wall structure is fabricated and preferably includes a plurality of four elongate horizontal resiliently flexible pressure elements or members 20 connected together in parallel relationship by a vertical fore end member 21 and a vertical plate 22. The end members 21 are preferably anchored to the pillars 17 by bolts 23 or equivalent means. The side wall structures comprised of the pressure elements are preferably operated by upright arms or levers 24. The upper extremities of the arms are preferably inturned and respectively pivotally connected at 25 to the upper ends of pairs of vertical members 26 in a manner whereby each of the wall structures can be moved relatively toward or away from one another and/or flexed to apply radial pressure to the mass of material as it is being formed and moved in the chamber. The upper ends of the members 26 are preferably welded to the top wall 15 and to a reenforcing structure 15' thereon and their lower ends to the side walls 1 of the base to impart stability to the framework. It will be noted that the arms are disposed longitudinally between the members. The arms 24 are preferably located no more than two-thirds of a bale length from the end of the ram stroke. The radial pressures may be varied to regulate the amount of frictional resistance between the mass and the side wall structures. These factors are important and will be described more in detail subsequently.

As best illustrated in FIGURE 4, the baler is provided with a stationary planar bottom cross brace 27 secured to the base side walls 1 below the outer extremity of the tiltable platform 14. The tiltable platform 14 is reinforced by a pair of parallel cross-members or supports 28 secured to its underside adjacent the downturned portion 19. The fore extremity of the platform is pivotally mounted on an axle 29, the latter being journalled or supported in the side walls 1 of the base. The platform is provided with downturned side flanges 30 which are guided by the walls 1. The cross-members 28 are disposed for connection with or support on a piston 31 constituting a part of the hydraulic unit 10, the latter being mounted on a base 32 secured to the brace 27. The piston serves to raise and lower the platform.

The mode of operatively connecting the platform with the arms 24 will now be described. As clearly shown in FIGURES 3 through 7, the side walls 1 of the base are provided with a first pair of stationary brackets 33 having holes therein which pivotally receive the rear ends of a pair of torsion rods 34 and with a second pair of stationary brackets 35 which pivotally receive the fore ends of the rods 34. The pairs of brackets which journal the rods in parallel relation are preferably welded to inner surfaces of the side walls 1 and are spaced longitudinally. It will be observed that the brackets 33 are disposed rearwardly and below the cross-members 28 on the platform 14 and that the brackets 35 are preferably located forwardly and below the axle 29 for the platform as well as forwardly of the arms 24.

A sleeve 36 is fixed on the rear end of each of the rods 34 and provided with a pair of spaced lateral horizontal projections 37. If found desirable, members in lieu of the sleeves can be fixed to the rods and journalled on the brackets or such members can be journalled on stub shafts carried by the brackets. A pin 38 is carried by each pair of the projections 37 and a pair of pins 39 are carried by the cross-members 28. A link 40 connects each of the pins 38 with each of the pins 39 to provide a pair of operative connections between the platform and the rods 34. A sleeve 41, similar to the sleeve 36, is fixed on the fore end of each of the rods 34 and provided with a pair of spaced depending projections 42 (see FIGURES 3 and 5). A pin 43 is carried by each pair of projections 42 and a pin 44 is carried by a pair of offsets 45 provided on each of the lower ends of the arms 24. A link 46 extends through a clearance opening 47 provided in each of the side walls 1 and connects with an adjacent pair of pins 43 and 44 to obtain a pair of operative connections between the arms 24 and the fore ends of the torsion rods or bars. The ends of the links 40 and 46 are preferably respectively connected to the pins 38 and 43 in order to afford proper adjustments of the connections between the rods and platform and between the rods and the arms. More particularly in this regard, the links 40 extend freely upwardly through the pins 39 and are provided with socket ends, to which access may be had through openings 14' provided in the tiltable wall 14, for manipulation by a tool to adjust the threaded lower ends of the links in the pins 38. The links 46 extend freely through the pins 44 and have socket outer ends for engagement by a tool to adjust the threaded inner ends of the links in the pins 43. Obviously, means other than that disclosed may be employed in obtaining adjustments between the various components of the structure.

In view of the foregoing, it should be manifest that when the piston 31 is reciprocated the side wall structures 16 will be caused to move toward and away from one another through the connections afforded by the torsion rods or bars 34. More particularly in this respect, when the piston, for example, is raised to elevate the platform 14, the rods 43 through the intermediation of the vertically disposed links 40 connecting the cross-members 28 and sleeves 36 will effect rotation of the rods in the brackets 33 and 35 and thereby pull or direct the arms 24 and side wall structures 16 toward one another through the agency of the horizontally disposed links 46. The rods may also twist depending on the pressures exerted when a bale is being formed. The arms, as stated above, are pivotally connected to the reenforcing structure 26 so that when the lower extremities of the arms are moved toward one another they will force the side wall structures inwardly to increase the frictional resistance against the mass being compacted and forced rearwardly onto the platform. Thus, the pull or forces applied to the arms increases as the piston rises.

It will be observed in FIGURE 5 that inner portions of the arms 24 are preferably inclined with respect to the vertical to provide elongate cam surfaces 48 whereby, for example, movement of the arms toward one another will cause the upper ends of the vertical plates 22 secured to the pressure members 20 to first receive pressure from the arms to effect inward movement of the uppermost pairs of the members 20 slightly in advance of the pairs of the lowermost members. In this way the side wall structures are gradually cammed or forced inwardly and gradually reversely released when the lower extremities of the arms are moved outwardly.

Figure 2:
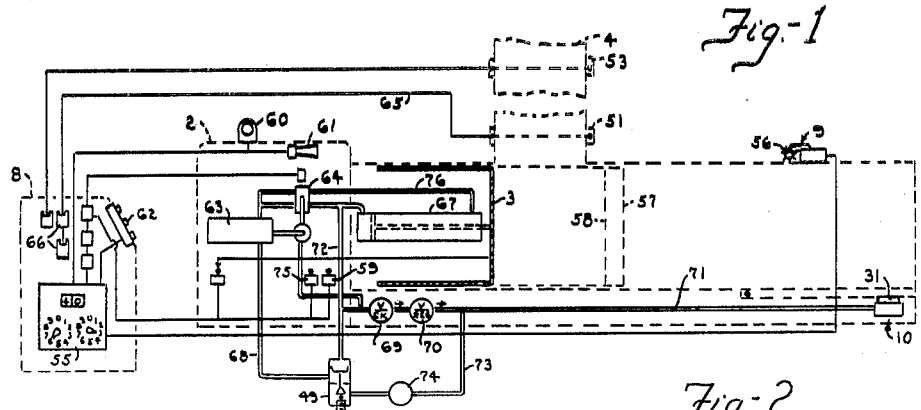
FIGURE 2 is a diagrammatic view depicting certain means employed to operate the ram, including controls therefor.
Figure 3:
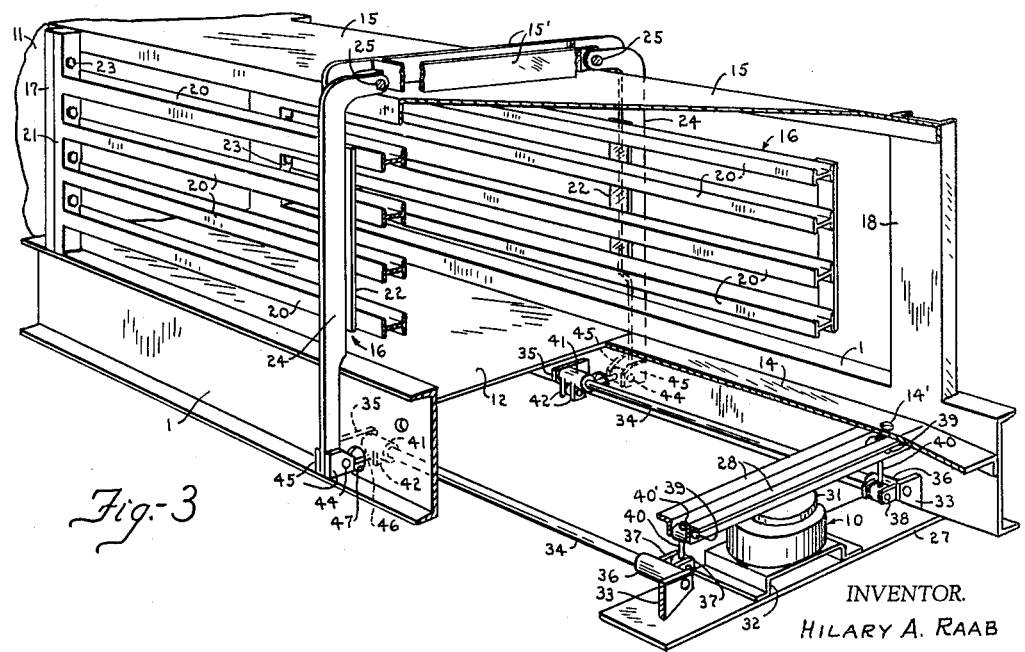
FIGURE 3 is an enlarged perspective view of part of the baler structure exemplifying certain details thereof.

It will also be manifest that as the density of the bale 13 increases the pressure exerted by the arms will become firmer. This results in causing the bale to expand in cross-section, thereby pressing it harder against the side wall structures 16, which in turn, causes these structures to move outwardly against the pressure arms. If the pressures exerted against the arms 24 are greater than the pre-stressing in the rods 34, the arms will move outwardly increasing the stress on the rods. By allowing the arms to move outward through the twisting of the torsion rods, the danger of bending the arms by overstressing is eliminated. During this action the extra load is transferred to the hydraulic unit 10 in advance of the travel of the bale mass 13 onto the platform 14, thereby assuring a downward pressure on the piston 31. If the unit 10 is being unloaded by a valve 49, as shown in FIGURE 2, sufficient force against the piston will assure its downward motion independent of a formed and tied bale 50 as shown in FIGURE 1.

As the mass 13 of material being formed into a bale advances to the position of bale 50 (the latter having been forced out of the baler) the piston will be forced downwardly due to the excess of hydraulic thrust demand, thereby moving the rods to distress them to reduce the pressure exerted by the arms 24 against the side wall structures 16 and lessen the pressure against the bale mass.

Although the pressure of the arms 24 against the side wall structure 16 against the bale mass 13 can increase or decrease by the raising or lowering of the piston because of the reactive force transfer through the torsion rods, there is always a preset converging pressure applied to the mass through the agency of the wall structures and arms. This is manually set by adjusting the links 40 and 46. These adjustments will vary with different materials to be baled and given bale density requirements where the density varies extremely such as paper compared to rock wool as compared to metal foil.

Within practicable limits of compaction the organization affords a unique setup for controlling the density of various grades of material, so that one bale after another can be baled without making any manual adjustments. Otherwise expressed, a corrugated board can be baled, followed by a mass of newsprint, boxwood, etc.

The side wall structures are normally disposed in a converging relation and the platform inclined upwardly so that they apply radial pressure from three directions tending to constrain, with practicable limits, the forward movement of a formed bale 50 and the mass 13 being formed. The organization is preferably such that the radial pressures applied to the formed bale and mass will create sufficient frictional resistance to cause the ram, through the agency of the unit 10, to increase the force exerted by the ram. When this occurs, the platform will be caused to tilt downwardly and the side wall structures outwardly to relieve such pressures. Provision is made for causing rapid short forward strokes of the ram after it advances to a predetermined pressure operating position in the chamber 6. With this unique organization a maximum baling pressure is maintained to produce bales of uniform compactness regardless of any variance in the density and the weight of the material being compressed.

The density of the bale is dependent in part on the applied pressure of the ram against that part of a bale already formed and held by constriction and frictional resistance, the uniformity of the material being formed, and the completeness of each charge of material fed to the chamber 6.

In order to obtain a better understanding of this setup and the structures above referred to, other components of the machine will now be described in conjunction therewith. As disclosed in my copending application, an electric eye 51 is mounted on the feed chute 4 to insure that the chamber receives a complete charge for each stroke of the ram and a bale locking device designated 52 is mounted on the baler adjacent the chambers 6 and 7 for automatically keeping the compressed material under compression when the ram is retracted. The eye 51 controls the automatic operation of the baler so that the ram will not act unless there is sufficient material available for baling. In other words, when the material builds or stacks up in the chamber 6 and in the chute 4 to a height or level with the eye, the eye initiates the movement of a control for the hydraulic operating means to cause the ram to move forwardly and this procedure continues as long as there is present a sufficient column of material. If the material flows to the baler at a rate faster than the baler can accommodate it, then another electric eye 53 on the chute 4, located above the eye 51, becomes effective to render a feeder (not shown) inoperative and operate a valve mechanism in receivers (not shown) to close the latter so that no material can be introduced thereto for conveyance to the baler. The eye 53 also serves to energize visual and audible signals and, if desired, valves for diverting the flow of material to various locations, including other auxiliary equipment.

The bale locking device 52, above referred to, includes a spring pressed pivotal lever or latch 54 which is adapted to be pivoted upwardly by each charge of material as it is compressed forwardly by the ram and then springs back to a normal operative position to engage and hold the compacted mass in place as the ram is retracted. This mass is preferably held at a predetermined location with its rear portion disposed between the upright and members 21 of the side wall structures and adjacent portions of the walls 11, 12 and 15 in order to seal off the chamber 6 from the chamber 7. Otherwise expressed, these walls define an internal peripheral bearing surface which is intimately engaged by the mass for sealing purposes. As the material travels down the chute, a certain amount of air is entrained in the chamber 6. When the ram advances, it valves off the chute and material collects above it and when reversed a void, the size of the ram head, is left for the material to enter. Attention is directed to the fact that the latch 54 projects through an aperture therefor in the top wall 15 and this aperture is of a size to closely receive the latch and thereby substantially prevent the escape of dust from the chamber. As alluded to above, the device 9 assists in automatically measuring the length of a bale being formed in order to eliminate the human error and other influences. This device is operatively connected to an automatic electrical counter 55 and an electrical control circuit which is not disclosed. By presetting the counter 55, a given distance can be counted by serrated discs 56 engaging the bale and when the predetermined number of counts has been reached an electrical impulse is delivered to a control circuit to cause the hydraulic operating means for the ram to move the ram head to a predetermined fixed forward position at rest, as indicated at 57 in FIGURE 2, which position is in advance of its normal operating stroke as indicated at 58 so that slots (not shown) in the head are exposed in order that bale ties can be readily inserted into the slots through the spaces between the pressure elements 20.

When the ram is in the forward fixed position 57, a mechanism carried by the ram trips a switch 59 to establish an electrical circuit that is utilized for operating a visual signal 60, an audible signal 61 on the baler, and energizing a signal (not shown) which may be located at a desirable remote area to notify the operator as to the condition of the baler. Also, this circuit can operate any auxiliary equipment desired. The ram operating means cannot function until a manual control button 62 is actuated to energize a control circuit to reactivate the operating means so that the ram will again operate normally. The circuitry just referred to is not disclosed in the drawings.

The hydraulic system will now be described. The purpose of this system is to provide fluid power to a compression ram with sufficient thrust and at such speeds as to develop the desired results for the baling operation.

A motor drives a vane type pump which sucks fluid from a storage tank 63 or reservoir and through a filter. Fluid passing through the pump is delivered to a pipe or line connected to a volume control valve and on to an open port of a four-way valve 64. The fluid is expelled through the port and then flows through a line to a heat exchanger and back to the storage tank or reservoir 63. If the volume of fluid being pumped is greater than the capacity of the heat exchanger, the excess fluid, which develops a pressure in a line connected therewith, is greater than the spring setting of a check valve, the latter opens and bypasses the fluid to the storage tank 63. The motor, filter, ports, lines, and exchanger are not shown in the drawings.

When the light beam of the electric eye 51 is broken, a conductor 65 carries a signal to a series of relays 66 in the control cabinet 8 which actuate a solenoid of the valve 64 causing the valve to shift so that the fluid will be forced by the pump through a port of this valve and a line connected thereto. The fluid flows from the last mentioned line through a check valve to the cap end of a cylinder 67, which operates the ram 3 forward. When pressure builds up in the aforesaid line against a valve and in cylinder 67, fluid will flow through a pilot line to open the last mentioned valve. Fluid then flows through this latter valve and through a pulsating booster and a connecting line. The booster develops high impact pressure creating rapid interrupted strokes to the ram as above referred to. The solenoid, all of the valves, ports, lines and booster are not disclosed in the drawings.

A drain line operatively connects the booster to the storage tank. A relief valve is connected by a line to another line as a safety factor to maintain a predetermined maximum pressure in the cylinder 67, such pressure being indicated on a gauge. A drain line connects the relief valve with the storage tank. Certain of the line, relief valve and gauges are not shown.

Pressure in the system also causes fluid to flow through a line operatively connected to a check valve 69. Fluid will flow from the check valve 69 through a metering valve 70. The fluid flows from the valve 70 through a line to a relief valve and a drain line connects this valve with the tank 63. A pressure gauge indicates pressure in the line between the valve 70 and relief valve, and such pressure forces fluid to flow through a line 71 to the hydraulic unit 10 to effect movement of piston 31 thereby raising the tiltable platform 14 and relative movement between the side wall structures 16. A drain line connects the unit 10 with the tank. A drain line connects the fourway valve 64 with the tank and a high pressure pilot line 72 is connected to the adjustable unloading valve 49.

The arrangement is preferably such that if frictional resistance on the bale 50 and the mass 13 as developed by the constricting movement of the side wall structures 16 and platform 14 exceeds the desired baling pressure as preset by the valve 49, such pressure will be relieved by fluid flow through a line 73, through a metering valve 74 which has a flow rate proportional to the flow through the valve 70, and the unloading valve 49 and back to storage tank through line 68. This organization is considered to be unique and constitutes a meritorious advance in the art of baling.

When the ram 3 reaches its normal forward operating position the mechanism carried by the ram, as alluded to above, actuates a switch 75 to energize through conductors a series of relays in the control cabinet 8 which actuates the solenoid of the four-way valve 64 causing the valve to shift so that the fluid will be forced by the pump through a port of this valve, and through a line 76 to the rod end of the cylinder 67 which retracts the ram 3. A pilot line connects the line 76 with a needle valve and this valve is connected to a preset relief valve which governs pilot line pressure available to a check valve through a line so that this valve will open relieving the pressure at the cap end of the cylinder 67. A drain line connects the relief valve with the tank 63.

In view of the foregoing, and assuming that the hydraulic pump is in operation and a control switch is set in an automatic position, the ram will continue to retract and as it comes to a stop another switch is actuated to interrupt the flow of current to the solenoid of the valve 64, thereby preventing further fluid flow to cylinder 67. Whenever the control switch is in any position but an automatic position and said switch is turned to this position, the ram of hydraulic cylinder 67 will always retract.

When the electric eye 51 is operated by interrupting the light beam, a holding circuit is established to assure continuance of the ram stroke to its entirety even if the eye becomes deenergized during the forward stroke of the ram. Upon completion of the forward stroke, the solenoid of the four-way valve 64 is energized to shift the valve, allowing hydraulic fluid to flow to the rod end of cylinder 67, thereby returning the ram. When the ram advances to a predetermined distance in the baling chamber 6, the switch 75 is actuated to break the holding circuit, which actuates valve 64 and momentarily stops hydraulic fluid flow to cylinder 67. At the same time, the solenoid of the valve 64 is energized, this valve shifts, allowing hydraulic fluid flow to be directed to the rod end of cylinder 67, thereby retracting the ram 3.

When the ram advances the bale in the second or elongate bale chamber 7 of the baler, a switch in the device 9 is operated, causing current flow from counter 55 to this switch and electric pulsations, created by the making and breaking of contacts in this switch, are recorded by the counter. When the predetermined bale length has been reached, as determined by this counter, the ram, regardless of its position, will advance toward the predetermined fixed position 57. As the ram reaches its full stroke forward to this predetermined fixed position the solenoid of the valve 64 will shift this valve and thereby stop fluid flow to cylinder 67 and prevent ram movement. With the ram in this forward fixed position, the bale can be tied in a conventional manner.

To return the ram 3 to automatic operation, the switch 62 is manually actuated to cause current to flow from this switch to a relay of the counter 55, energizing and resetting its mechanism for remeasuring the next bale; also interrupting curent flow to the coil of another relay, reestablishing the normal reversing circuit. As the ram reverses, the switch 59 deenergizes the coil of a relay to cause its contacts to return to a normally off position and deenergize signals 60 and 61.

Having thus described my invention, it is obvious that various modifications may be made in the same without departing from the spirit of the invention, and, therefor, I do not wish to be understood as limiting myself to the exact forms, constructions, arrangements, and combinations of parts herein shown and described.

I claim:

1. A baler comprising a frame, an elongate chamber having a top wall, a pair of relatively movable side wall structures, a lower pressure responsive wall, rod means journaled in said frame and extending longitudinally below said responsive wall, and means operatively connecting paid rod means with said responsive wall and said wall structures, said rod means being twistable about its axis for imparting relative movement to said wall structures when pressure is applied to said responsive wall.

2. The baler defined in claim 1, including means for adjusting the twist of said rod means.

3. A baler comprising a frame, a chamber having a top wall, a pair of relatively movable side walls and a pressure responsive bottom wall, pivot means pivotally connecting said bottom wall to said frame, a pair of vertically disposed arms having upper ends pivotally connected adjacent said top wall and lower ends disposed below said side walls, and rod means journaled on said frame operatively connecting said bottom wall and said lower ends of said arms, said rod means being twistable about its axis in a manner whereby when pressure is applied downwardly against said bottom wall said arms will be pivoted to simultaneously effect outward movement of said side walls.

4. The baler defined in claim 3, in which said vertically disposed arms are respectively provided with inner cam surfaces which serve to gradually vary pressure applied to said side walls when said arms are moved toward and away from one another.

5. The baler defined in claim 3, in which each of said side walls includes a plurality of vertically spaced longitudinally extending members connected together by a plate, and said vertically disposed arms are respectively provided with inner cam surfaces for engaging said plates for applying pressure thereto whereby certain of the members of each wall may be caused to move toward one another in advance of other members of each wall.

6. The baler defined in claim 5, in which said pressure responsive bottom wall is provided with a pair of openings through which means may be extended for adjusting said second pair of links.

7. The baler defined in claim 5, in which said frame includes a base having a pair of spaced side walls provided with openings through which said first pair of links respectively extend laterally and are adjustably connected with said lower ends of said upstanding members.

8. A baler comprising a frame, a chamber having a top wall, a pair of relatively movable side walls and a pressure responsive bottom wall, pivot means pivotally connecting said bottom wall to said frame, pressure means disposed under said bottom wall for applying pressure thereto to pivot the same, a pair of vertically disposed arms having upper ends pivotally connected adjacent said top wall and lower ends disposed below said side walls, and a pair of torsion rod means having opposite ends journaled on said frame extending longitudinally thereof and operatively connecting said bottom wall and said lower ends of said arms in a manner whereby when pressure is applied upwardly against said bottom wall by said pressure means said arms, through the agency of said rod means will be pivoted to simultaneously effect inward movement of said side walls.

9. A baler comprising a frame, a chamber having a top wall, a pair of relatively movable side walls and a pressure responsive bottom wall, a pair of upstanding movable members for applying pressure to said side walls, said members having upper ends connected to said frame and lower ends, a pair of torsion rods having inner ends and outer ends, a first pair of links respectively operatively connecting the inner ends of said rods with the lower ends of said members, and a second pair of links operatively connecting the outer ends of said rods with said bottom wall in a manner whereby when pressure is applied to move said bottom wall said side walls will be caused to move relative to one another.

10. A baler comprising a frame, a chamber having an entrance and an outlet, said chamber being formed by a top wall, a pair of relatively movable side walls normally converging toward said outlet, pressure responsive means, and means including a pair torsion rods having their ends journaled on said frame and extending lengthwise of said chamber operatively connecting said responsive means and said side walls whereby the latter coactively move and offer resistance to radial pressures exerted by material adapted to be forced through said chamber.

11. A baler comprising a frame, an elongate open-ended chamber having a stationary top wall, a stationary bottom wall, a pressure responsive tiltable wall constituting a continuation of said bottom wall, a pair of relatively movable side wall structures extending below said top wall and beyond said bottom wall in overhead relation to said tiltable wall, means for moving said side wall structures, and means including a pair of rods having their ends journaled on said frame and extending longitudinally thereof operatively connecting said tiltable wall and said moving means in a manner whereby when pressure is applied to move said tiltable wall said moving means will transmit movement to said side walls.

12. A baler comprising a frame and a first chamber provided with an opening for receiving material to be baled, a second chamber constituting a continuation of said first chamber, said second chamber being elongate and comprising a bottom stationary wall, a tiltable platform constituting a continuation of said bottom wall and having an outer portion normally disposed above the level thereof for depression by compressed material adapted for travel through said second chamber, a top wall extending substantially coextensively with and over said bottom wall and platform, a pair of relatively movable elongate resiliently flexible side wall structures having inner extremities secured to said frame at a location adjacent said first chamber and also having outer free extremities terminating above said platform, a pair of upright members having upper ends pivotally connected to said frame and lower ends disposed below said bottom wall, and means including a pair of rods having opposite end journaled on said frame and extending longitudinally thereof operatively connecting said outer portion of said platform with said lower ends of said members in a manner whereby when pressure is applied to move said platform said side wall structures will be simultaneously moved through the agency of said members.

13. A baler comprising a frame, a plurality of elongate relatively movable walls defining an elongate baling chamber, elongate torsion rods having opposite ends journaled on said frame lengthwise of said chamber, and means operatively connecting certain of said walls and said torsion rods in a manner whereby to effect substantially simultaneous movement between said certain walls when material of varying density is forced through the chamber.

14. A baler comprising a frame provided with a top wall, a pair of relatively movable side walls and a bottom wall having a movable continuation, said walls and continuation forming an elongate chamber, said side walls and said continuation serving to apply radial pressures to a mass of material adapted to be forced through the chamber, and means including a pair of rods having opposite ends journaled on said frame and operatively connecting said side walls and said continuation, variable power means for actuating said continuation to effect movement of said side walls through said connecting means, the arrangement being such that said rods will automatically vary the radial pressures applied to the mass as it is forced through said chamber.

References Cited by the Examiner

UNITED STATES PATENTS

| | | | |
|---|---|---|---|
| 1,631,881 | 6/27 | Murray | 100—191 |
| 2,823,603 | 2/58 | Collins. | |
| 3,090,182 | 5/63 | Johnson et al. | 100—191 X |

WALTER A. SCHEEL, *Primary Examiner.*

LOUIS O. MAASSEL, *Examiner.*